US009256957B1

United States Patent
Frey et al.

(10) Patent No.: US 9,256,957 B1
(45) Date of Patent: Feb. 9, 2016

(54) METHOD FOR MOVING-OBJECT DETECTION TRACKING IDENTIFICATION CUEING OF VIDEOS

(71) Applicant: BAE Systems Information And Electronic Systems Integration Inc., Nashua, NH (US)

(72) Inventors: Nathan J. Frey, Cambridge, MA (US); Mark A. Keck, Jr., Medford, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 232 days.

(21) Appl. No.: 14/024,026

(22) Filed: Sep. 11, 2013

Related U.S. Application Data

(60) Provisional application No. 61/700,493, filed on Sep. 13, 2012.

(51) Int. Cl.
*G06K 9/00* (2006.01)
*G06T 7/20* (2006.01)

(52) U.S. Cl.
CPC ............. *G06T 7/2053* (2013.01); *G06T 7/2093* (2013.01)

(58) Field of Classification Search
CPC ............ G06F 17/30811; G06T 7/0032; G06T 7/0071
See application file for complete search history.

(56) References Cited

U.S. PATENT DOCUMENTS

| 6,359,647 | B1 | 3/2002 | Sengupta et al. |
| 7,433,495 | B2 | 10/2008 | Rui et al. |
| 8,170,395 | B2 | 5/2012 | Sterner et al. |
| 8,184,855 | B2 | 5/2012 | Tong et al. |
| 2007/0279494 | A1 | 12/2007 | Aman et al. |
| 2008/0060034 | A1 | 3/2008 | Egnal et al. |
| 2010/0026809 | A1* | 2/2010 | Curry ............................ 348/157 |
| 2010/0098307 | A1* | 4/2010 | Huang et al. .................. 382/128 |

(Continued)

OTHER PUBLICATIONS

Nguyen et al., Understanding Tracking and StroMotion of Soccer Ball, UNCC Soccer Ball Tracking Project, 2007, pp. 1-5, found at http://fcl.uncc.edu/nhnguyel/ballTracking.pdf, and presented on Nov. 27, 2007, found at http://www.slideshare.net/khanhat/soccer-ball-tracking.*

(Continued)

*Primary Examiner* — Vu Le
*Assistant Examiner* — Guillermo Rivera-Martinez
(74) *Attorney, Agent, or Firm* — Sand & Sebolt; Joseph A. Sebolt; Daniel J. Long

(57) ABSTRACT

A system and method for tracking a spherical ball is presented. A system includes grayscale conversion logic configured to convert an input image into a grayscale image. Motion detection logic detects motion of the ball in the grayscale image and generates a motion likelihood image output. Template matching logic template matches the input image and generates a template likelihood image output indicating where the ball is in the grayscale image. Color matching logic color matches the ball to the input image and generates a color space likelihood image. Fusion logic produces a final fused likelihood image output based on the motion likelihood image output, template likelihood image output and color space likelihood image output. Ball localization logic generates a ball location value and a confidence based on finding an optimal value in the final fused likelihood image output.

18 Claims, 2 Drawing Sheets

(56) References Cited

U.S. PATENT DOCUMENTS

2011/0032361 A1 2/2011 Tamir et al.
2011/0242326 A1* 10/2011 Essa et al. .................... 348/157

OTHER PUBLICATIONS

Liang et al., A Scheme for Ball Detection and Tracking in Broadcast Soccer Video, 2005, PCM 2005, Part I, LNCS 3767, pp. 864-875.*

Wu et al., Templete Matching using Correlation Coefficiens, Aug. 31, 2010, (AAPA), furnished via IDS.*

Stauffer, Chris and Grimsom, W.E.L, "Adaptive Background Mixture Models for Real-Time Tracking," The Artificial Intelligence Laboratory, Massachusetts Institute of Technology, Cambridge, MA 02139, Jun. 1999.

http://www.mathworks.com/matlabcentral/fileexchange/28590-template-matching-using-correlation-coefficients—Wu, Yue, "Template Matching Using Correlation Coefficients," Aug. 30, 2010.

* cited by examiner

METHOD FOR MOVING-OBJECT DETECTION TRACKING IDENTIFICATION CUEING OF VIDEOS

CROSS REFERENCE TO RELATED APPLICATIONS

This application claims priority from U.S. Provisional Patent Application Ser. No. 61/700,493, filed Sep. 13, 2012, the disclosure of which is incorporated herein by reference.

BACKGROUND OF THE INVENTION

1. Field of Invention

The current invention relates generally to apparatus, systems and methods for processing images. More particularly, the apparatus, systems and methods related to detecting moving objects in images. Specifically, the apparatus, systems and methods provide for detecting moving objects that are regularly shaped objects in images.

2. Description of Related Art

As far back as the earliest recorded history it is clear that humans appreciate participating and viewing games and sporting events. Many of today's sports were practiced by the Ancient Egyptians, who set the rules and regulations for them. Inscriptions on monuments indicate that they practiced wrestling, weightlifting, long jump, swimming, rowing, shooting, fishing and athletics, as well as various kinds of ball games. Ancient Egyptian kings, princes and statesmen were keen on attending sports competitions, which they encouraged and provided with the necessary equipment.

Drawings on pharaonic monuments tell us that several thousand years ago; the Egyptians had laid down basic rules for games, chosen a neutral referee, a uniform for players, and a means of announcing the winners by awarding them different collars. Both winner and loser were met with ovation, the first for his superiority and the latter for his sporting spirit.

Ancient Egyptians played a game that is similar to our present-day hockey. Drawings on tombs at Beni Hassan in Menia Governorate show players holding bats made of long palm-tree branches, with a bent end similar to that of the hockey bat. The hockey ball was made of compressed papyrus fibers covered with two pieces of leather in the shape of a semicircle. The ball was dyed in two or more colors.

Drawings of this sport are found on the Saqqara tombs, five thousand years old. The ball was made of leather and stuffed with plant fibers or hay, or made of papyrus plants in order to be light and more durable. It was seldom used for more than one match. Each team throws the ball to the other at the same time. Players can either be on their feet or on top of their teammates' backs while exchanging balls.

Another sport that was historically very popular was the gladiator games that reached their peak in the Roman Empire. The term gladiator is the Latin word gladiator for "swordsman" that was derived from the Latin word for sword: "gladius". The gladiator was an armed combatant who entertained audiences in the Roman Republic and Roman Empire in violent confrontations with other gladiators, wild animals, and condemned criminals. Some gladiators were volunteers who risked their legal and social standing and their lives by appearing in the arena. Most were despised as slaves, schooled under harsh conditions, socially marginalized, and segregated even in death.

Irrespective of their origin, gladiators offered spectators an example of Rome's martial ethics and, in fighting or dying well; they could inspire admiration and popular acclaim. They were celebrated in high and low art, and their value as entertainers was commemorated in precious and commonplace objects throughout the Roman world.

The games reached their peak between the 1st century BCE and the 2nd century CE, and they finally declined during the early 5th century after the adoption of Christianity as state church of the Roman Empire in 380, although beast hunts (venationes) continued into the 6th century. People enjoyed viewing these and other sports in giant stadiums designed to give everyone a good view. Today sporting events are still viewed in large stadiums and arenas where the best viewing seats are sold for the highest prices. Video displays are now often used to provide for replays and allow views in more distant seats the opportunity to better view a sporting event. However, some sporting action is fast and might not be viewed well by all spectators. What is needed is a better way of viewing graphical content such as sporting event content

SUMMARY

The preferred embodiment of the invention includes a system for tracking a spherical ball. The system includes grayscale conversion logic configured to convert an input image into a grayscale image. Motion detection logic detects motion of the ball in the grayscale image and generates a motion likelihood image output. Template matching logic template matches the input image and generates a template likelihood image output indicating where the ball is in the grayscale image. Color matching logic color matches the ball to the input image and generates a color space likelihood image. Fusion logic produces a final fused likelihood image output based on the motion likelihood image output, template likelihood image output and the color space likelihood image output. Ball localization logic generates a ball location value and a confidence based on finding an optimal value in the final fused likelihood image output.

Another configuration of the preferred embodiment is a method of tracking a round ball from image-to-image. The method begins by converting an input image into a grayscale image. A motion of the round ball in the grayscale image is then detected with respect to an older image. A motion likelihood image output indicating where the round ball is in the grayscale image is generated based on the detecting motion. The grayscale image is also template matched to find the round ball in the grayscale image based, at least in part, on at least one template of the round ball. Upon template matching, a template likelihood image output is generated indicating where the round ball is in the grayscale image based on the template matching. The method color matches the round ball to the input image using any appropriate color matching algorithms. A color space likelihood image output is generated based, at least in part, on the color matching that indicates where the round ball is in the input image. Next, based at least in part on the motion likelihood image output, the template likelihood image output and the color space likelihood image output a final fused likelihood image output is produced. A round ball location value and a confidence is produced based on finding an optimal value in the final fused likelihood image output.

BRIEF DESCRIPTION OF SEVERAL VIEWS OF THE DRAWINGS

One or more preferred embodiments that illustrate the best mode(s) are set forth in the drawings and in the following description. The appended claims particularly and distinctly point out and set forth the invention.

The accompanying drawings, which are incorporated in and constitute a part of the specification, illustrate various example methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

Similar numbers refer to similar parts throughout the drawings.

DETAILED DESCRIPTION

Figure 1:
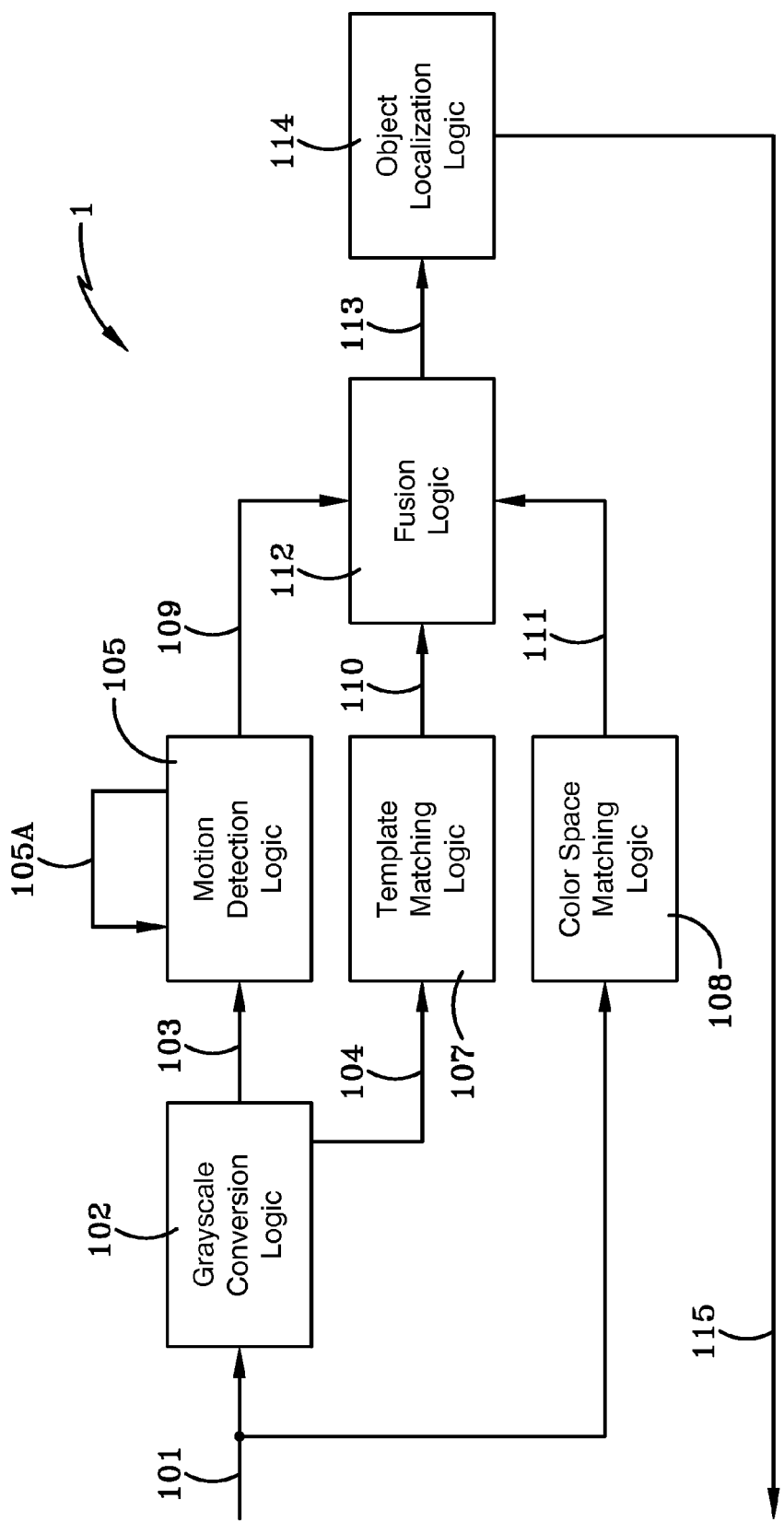
FIG. 1 illustrates a schematic diagram of a preferred embodiment of a system for tracking a round ball.

FIG. 1 illustrates the preferred embodiment of a system 1 for tracking a moving object that is of a regular shape when viewed from different positions and/or when the object is oriented in differing positions. For example, the preferred embodiment system 1 is particularly good at tracking a regular shaped spherical object such as a ball. Thus, the system 1 can have many applications to track a ball in a sporting event and accomplish this task using much less computing power and hardware than prior art systems.

The input to the system 1 is a red, green, blue (RGB) 30 frames per second (FPS) video stream(s) 101. The video stream can be provided to the system 1 in a digital form and separated into individual images that represent 1/30th of a second of the video. The system 1 can operate on one camera's feed or n-number of overlapping feeds.

The system 1 includes grayscale conversion logic 102. "Logic", as used herein, includes but is not limited to hardware, firmware, software and/or combinations of each to perform a function(s) or an action(s), and/or to cause a function or action from another logic, method, and/or system. For example, based on a desired application or needs, logic may include a processor such as a software controlled microprocessor, discrete logic like an application specific integrated circuit (ASIC), a programmed logic device, a memory device containing instructions, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

As each frame is received by the system 1, the grayscale conversion logic 102 converts them into images represented in a grayscale format. As appreciated by those of ordinary skill in the art, the grayscale conversion logic 102, may convert video content into grayscale using a mixture of the color channels. As illustrated a same grayscale image is output as grayscale image 103 and grayscale image 104. Grayscale images can be represented with 8-bit pixels or another number of pixels.

Next, the system 1 begins to predict where the moving object is located. To do this motion detection logic 105, template logic 107 and color space logic 108 all operate in parallel to make three different predictions on wherein the object is. A fusion logic 112 discussed later fuses these results together and then an object (e.g., ball) location logic 114 determines which of the fused locations 113 is the most accurate.

The motion detection logic 105 is used to detect motion in grayscale images 103. For example, motion can be detected in the form of a Gaussian Mixture Model which is performed on each camera view. The motion detection logic 105 then can normalize the resulting image to between 0 and 1 (by dividing by 255) to generate a background model persistence as disclosed in the publically available article entitled "Adaptive background mixture models for real-time tracking," by Chris Stauffer and W. E. L. Grimson, published in 1998 by the Artificial Intelligence Laboratory at the Massachusetts Institute of Technology in Cambridge, Mass., the contents of which are incorporated herein by reference. The motion detection logic 105 has a feedback path 105A so that older images may be used in predicting where the object is in newer images. Of course motion can be detected in other ways as understood by those of ordinary skill in the art.

The other grayscale image 104 is input to a template matching logic 107. The template matching logic 107 can template match by a normalized cross correlation based template matching which can be used to produce a likelihood image (bound between 0 and 1). One version of this algorithm as is disclosed in the publically available article and electronic file entitled "Template Matching using Correlation Coefficients" by Yue Wu published on Aug. 30, 2010 and available for public inspection at Matlab Central, the contents of which are incorporated herein by reference. Two templates of the ball can be used in the template matching algorithm implemented by the template matching logic 107 and the result that has the highest peak can be used in the fusion logic 112 as discussed below. The two templates of the object are cropped from the input image when the object (e.g., ball) was still and a short time when the object was moving (which has motion blur). Using a combination of both provides a good result when the object (e.g., ball) was still and when it is moving quickly. This was demonstrated when the preferred embodiment was implemented in practice.

The color space matching logic 108 implements an algorithm which computes the object's (e.g., ball's) location based on color matching that is invariant to the shading effect on the ball produced by overhead lighting. A top color sample is taken from the top of the object (e.g., ball) and a bottom color sample from the bottom of the object can be taken (light and dark color). The two samples can consist of 3 RGB values and are in the preferred embodiment are constants. However, as understood by those with ordinary skill in the art, the color space matching logic 108 could implement any suitable color matching algorithm as known in the art.

As each color image enters the color space matching logic, each pixel is compared with the constant object values. This done in the preferred embodiment of the color matching logic 108 by plotting a line in 3-d space between the first constant RGB value and the second RGB value (top and bottom color samples). The value of each pixel is measured from the nearest point on the line and normalized so the following results are obtained.

Q1: ball's light color
Q2: ball's dark color
P: Pixel value
X: cross product
Norm: l2 normalization $$\text{Pixel Likelihood Value} = (100 - \text{norm}((Q2-Q1) \times (P-Q1))/\text{norm}(Q2-Q1))/100$$

In the preferred embodiment, the above procedure is preferably performed at a down-sampled resolution and resized to the original image dimensions using a nearest-neighbor method to achieve the motion likelihood image output 109, the template likelihood image output 110, and the color space likelihood image output 111.

Fusion logic 112 takes the three predicted outputs 109, 110, 111 and combines the likelihood of all three outputs to produce the final fused likelihood image output 113. In the preferred embodiment, this is done through pixel level multiplication of all the likelihood images to produce a final fused likelihood image output 113. Of course, those of ordinary skill in the art will understand that any appropriate fusion algorithm could be implemented in the fusion logic 112.

The object localization logic 114 contains logic to determine the peak pixel value of the final fused likelihood image output. This output gives the ball's location. In the preferred embodiment, a peak must exceed a threshold for it to be considered an accurate representation of the location as at object (e.g., ball). This value is output as a confidence value 115 that expresses the likelihood of the ball being at a position associated with this output at a particular moment in time.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Figure 2:
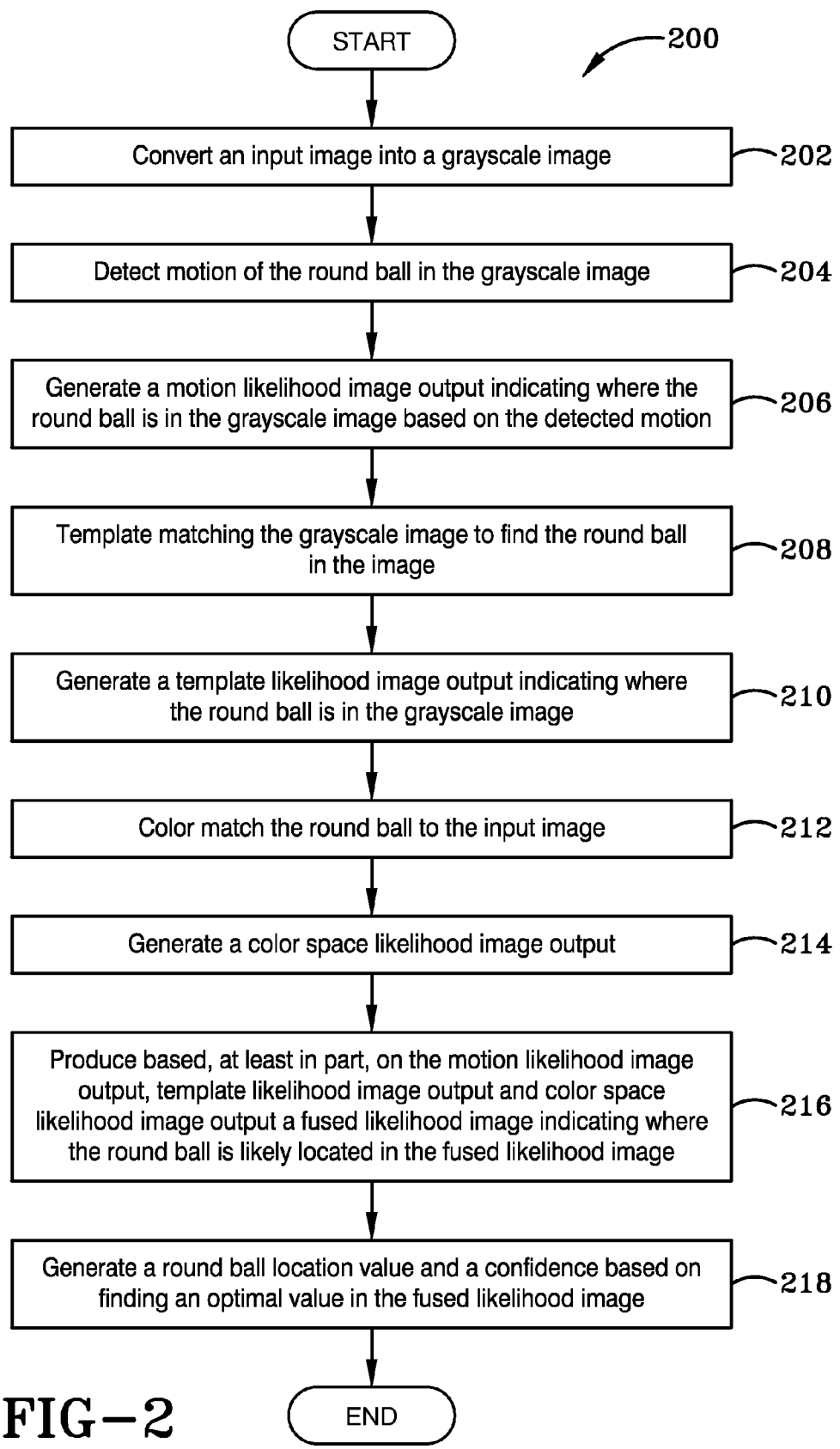
FIG. 2 illustrates an embodiment of a method for tracking a round ball.

FIG. 2 illustrates a method 200 of tracking a round ball from image-to-image. The method 200 begins by converting an input image into a grayscale image, at 202, in a manner as discussed earlier. A motion of the round ball in the grayscale image is detected, at 204, with respect to an older image. Any appropriate motion detection algorithm can be used as understood by those of ordinary skill in the art. A motion likelihood image output is generated, at 206, based on the motion detected at 204. The grayscale image is also template matched as discussed above, at 208, to find the round ball in the grayscale image based, at least in part, on at least one template of the round ball. For example, two or more templates of the round ball that can be used to find the round ball in the grayscale image. Upon template matching, a template likelihood image output is generated, at 210, indicating where the round ball is in the grayscale image based on the template matching. The method 200 color matches the round ball to the input image, at 212, using any appropriate color matching algorithm. At 214, a color space likelihood image output is generated based, at least in part, on the color matching that indicates where the round ball is in the input image. Next, based at least in part on the motion likelihood image output, template likelihood image output and color space likelihood image output a final fused likelihood image output is produced, at 206. A round ball location value and a confidence are produced, at 218, based on finding an optimal value in the final fused likelihood image output. These values indicate where the round ball is likely located in the final fused likelihood image output.

In other embodiments, the color matching can include taking a top color sample from the top of the round ball and determining a bottom color sample from the bottom of the round ball. The top color sample and the bottom color sample are comprised of 3 RGB values and are constants. The pixel values of the input image are compared with the top color sample and the bottom color sample to locate the round ball in the input image. The color space likelihood image output is based, at least in part, on the comparing pixel values. The comparing pixel values of the input image with the top color sample and the bottom color can include plotting a line in 3-d space between the top color sample and the bottom color sample. As discussed earlier values of pixels of the input image as measurements from a nearest point on the line and normalized so the following results are obtained:

Q1=the round ball's light color;
Q2=the round ball's dark color;
P=Pixel value;
where X is a cross product;
wherein norm is an l2 normalization;

$$\text{pixel likelihood values} = (100 - \text{norm}((Q2-Q1) \times (P-Q1))/\text{norm}(Q2-Q1))/100;$$

The color space likelihood image output is based, at least in part, on the pixel likelihood values.

In another embodiment of the method the color matching can include other actions. For example, it can include performing the color matching at a down-sampled resolution. It can then also include resizing the original image dimensions of the input image using a nearest-neighbor method to achieve the color space likelihood image output.

The related and co-owned U.S. Applications entitled "METHOD FOR BALL/PERSON TRACKING—VIDEO OF SPORTS PLAY—SIDE & ELEVATED CAMERAS" and "METHOD TO PERFORM INTRINSIC CALIBRATION OF CAMERA MODELS," which are filed contemporaneously herewith, are incorporated as if fully rewritten.

In the foregoing description, certain terms have been used for brevity, clearness, and understanding. No unnecessary limitations are to be implied therefrom beyond the requirement of the prior art because such terms are used for descriptive purposes and are intended to be broadly construed. Therefore, the invention is not limited to the specific details, the representative embodiments, and illustrative examples shown and described. Thus, this application is intended to embrace alterations, modifications, and variations that fall within the scope of the appended claims.

Moreover, the description and illustration of the invention is an example and the invention is not limited to the exact details shown or described. References to "the preferred embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in the preferred embodiment" does not necessarily refer to the same embodiment, though it may.

What is claimed is:

1. A system for tracking a spherical ball that moves in different images capture of the ball comprising:
    a grayscale conversion logic configured to receive an input image and to convert the input image into a grayscale image;
    motion detection logic configured to detect motion of the ball in the grayscale image with respect to an older image and to generate a motion likelihood image output indicating where the ball is in the grayscale image based on detected motion;

template matching logic configured to preform template matching to find the object in the grayscale image based, at least in part, on at least one template of the object and to generate a template likelihood image output indicating where the ball is in the grayscale image based on the template matching;

color matching logic configured to color matching the ball to the input image and to generate a color space likelihood image output indicating where the ball is in the input image based on the color matching;

fusion logic configured to produce a final fused likelihood image output based, at least in part, on the motion likelihood image output, template likelihood image output and color space likelihood image output;

ball localization logic configured to generate a ball location value and a confidence based on finding an optimal value in the final fused likelihood image output; and wherein the optimal value crosses a threshold value and the threshold value is 0.83.

2. The system of claim 1 wherein the input image is a digital frame of a series of frames.

3. The system of claim 2 wherein the series of frames is received from a single digital camera.

4. The system of claim 2 wherein the series of frames is received from two or more digital cameras.

5. The system of claim 2 wherein each frame of the series of frames is taken every 1/30 of a second.

6. The system of claim 1 wherein the grayscale image is composed of 8-bit pixels.

7. The system of claim 1 wherein the template matching logic further comprises:

normalization logic configured to normalize the grayscale image to produce a normalized likelihood image and wherein the template likelihood image output is based, at least in part, on the normalized likelihood image.

8. The system of claim 7 wherein the normalized likelihood image is formed with pixels bound between 0 and 1.

9. The system of claim 1 wherein the object is a basketball.

10. The system of claim 1 wherein the motion detection logic further comprises:

a Gaussian logic configured to detect motion of the object in the grayscale image in the form of a Gaussian Mixture Model, and wherein the motion likelihood image output is based, at least in part, on the Gaussian Mixture Model.

11. The system of claim 1 wherein the motion detection logic is further configured to normalize the motion likelihood image output.

12. A system for tracking a symmetrical object that moves in images comprising:

a grayscale conversion logic configured to receive an input image and to convert the input image into a grayscale image;

motion detection logic configured to detect motion of the object in the grayscale image with respect to an older image and to generate a motion likelihood image output indicating where the object is in the grayscale image based on detected motion;

template matching logic configured to preform template matching to find the object in the grayscale image based, at least in part, on at least one template of the object and to generate a template likelihood image output indicating where the object is in the grayscale image based on the template matching;

color matching logic configured to color matching the object to the input image and to generate a color space likelihood image output indicating where the object is in the input image based on the color matching;

fusion logic configured to produce a final fused likelihood image output based, at least in part, on the motion likelihood image output, template likelihood image output and color space likelihood image output; and object localization logic configured to generate an object location value and a confidence based on finding an optimal value in the final fused likelihood image output; and wherein the optimal value crosses a threshold value and the threshold value is 0.83.

13. The system of claim 12 wherein the symmetrical object is a spherical ball.

14. A method for tracking a round ball from image-to-image comprising:

converting an input image into a grayscale image;

detecting motion of the round ball in the grayscale image with respect to an older image;

generating a motion likelihood image output indicating where the round ball is in the grayscale image based on detected motion;

template matching the grayscale image to find the round ball in the grayscale image based, at least in part, on at least one template of the round ball;

generate a template likelihood image output indicating where the round ball is in the grayscale image based on the template matching;

color matching the round ball to the input image;

generating a color space likelihood image output indicating where the round ball is in the input image based, at least in part, on the color matching;

producing a final fused likelihood image output based, at least in part, on the motion likelihood image output, template likelihood image output and color space likelihood image output; and generating a round ball location value and a confidence based on finding an optimal value in the final fused likelihood image output wherein the optimal value crosses a threshold value and the threshold value is 0.83.

15. The method of claim 14 wherein the template matching further comprises:

two or more templates of the round ball that are used to find the round ball in the grayscale image.

16. The method of claim 14 wherein the color matching further comprises:

taking a top color sample from the top of the round ball and determining a bottom color sample from the bottom of the round ball, wherein the top color sample and the bottom color sample are comprised of 3 RGB values and are constants; and and comparing pixel values of the input image with the top color sample and the bottom color sample to locate the round ball in the input image, wherein the color space likelihood image output is based, at least in part, on the comparing pixel values.

17. The method of claim 16 wherein the comparing pixel values of the input image with the top color sample and the bottom color sample further comprise:

plotting a line in 3-d space between the top color sample and the bottom color sample;

determining values of pixels of the input image as measurements from a nearest point on the line and normalized so the following results are obtained:

$Q1$=the round ball's light color;

$Q2$=the round ball's dark color;

$P$=Pixel value;

where X is a cross product;

wherein norm is an l2 normalization;

pixel likelihood values=(100−norm(($Q2-Q1$)×($P-Q1$))/norm($Q2-Q1$))/100;

wherein the color space likelihood image output is based, at least in part, on the pixel likelihood values.

18. The method of claim 14 wherein the color matching further comprises:
performing the color matching at a down-sampled resolution; and
resizing original image dimensions of the input image using a nearest-neighbor method to achieve the color space likelihood image output.

* * * * *